United States Patent
Wills

(10) Patent No.: US 12,162,605 B2
(45) Date of Patent: Dec. 10, 2024

(54) AIRCRAFT PASSENGER ACCOMMODATION UNIT WITH MOVEABLE OTTOMAN

(71) Applicant: Safran Seats GB Limited, Cwmbran (GB)

(72) Inventor: Paul Wills, Cwmbran (GB)

(73) Assignee: SAFRAN SEATS GB LIMITED, Cwmbran (GB)

( * ) Notice: Subject to any disclaimer, the term of this patent is extended or adjusted under 35 U.S.C. 154(b) by 347 days.

(21) Appl. No.: 17/630,118

(22) PCT Filed: Jul. 23, 2020

(86) PCT No.: PCT/GB2020/051756
§ 371 (c)(1),
(2) Date: Jan. 25, 2022

(87) PCT Pub. No.: WO2021/019210
PCT Pub. Date: Feb. 4, 2021

(65) Prior Publication Data
US 2022/0258866 A1   Aug. 18, 2022

(30) Foreign Application Priority Data

Jul. 29, 2019 (GB) ...................................... 1910807

(51) Int. Cl.
*B64D 11/06* (2006.01)

(52) U.S. Cl.
CPC ...... *B64D 11/0643* (2014.12); *B64D 11/0601* (2014.12); *B64D 11/0602* (2014.12); *B64D 11/0606* (2014.12); *B64D 11/0641* (2014.12)

(58) Field of Classification Search
CPC ............ B64D 11/0643; B64D 11/0601; B64D 11/0602; B64D 11/0606; B64D 11/0641
See application file for complete search history.

(56) References Cited

U.S. PATENT DOCUMENTS

| | | | | |
|---|---|---|---|---|
| 5,954,401 A | * | 9/1999 | Koch | B60N 2/242 297/184.14 |
| 8,662,447 B2 | * | 3/2014 | Johnson | B64D 11/0605 244/118.6 |

(Continued)

FOREIGN PATENT DOCUMENTS

| | | |
|---|---|---|
| EP | 3275786 A1 | 1/2018 |
| WO | 2019088297 A1 | 5/2019 |

OTHER PUBLICATIONS

International Patent Application No. PCT/GB2020/051756, International Search Report and Written Opinion, dated Oct. 21, 2020.

(Continued)

*Primary Examiner* — Milton Nelson, Jr.
(74) *Attorney, Agent, or Firm* — Kilpatrick Townsend & Stockton LLP

(57) ABSTRACT

An aircraft passenger accommodation unit is disclosed. The aircraft passenger accommodation unit comprises a seat, a wall, an ottoman, and a console. An access path comprising a width is defined between the wall and the ottoman, the access path providing passenger access to the seat. The ottoman is moveably mounted with respect to the console and moveable between an extended position and a retracted position to change the width of the access path, and the ottoman is at least partially received within the console when the ottoman is in the retracted position.

20 Claims, 4 Drawing Sheets

(56) References Cited

U.S. PATENT DOCUMENTS 11,148,810 B2 * 10/2021 Kigoshi ................. B64D 11/06
2017/0240283 A1     8/2017 Dowty
2017/0259923 A1 *  9/2017 Morgan ............. B64D 11/0644

OTHER PUBLICATIONS

United Kingdom Patent Application No. 1910807.5, Search Report, dated Jan. 22, 2020.

* cited by examiner

AIRCRAFT PASSENGER ACCOMMODATION UNIT WITH MOVEABLE OTTOMAN

CROSS-REFERENCE TO RELATED APPLICATIONS

This application is a national stage application of International Patent Application No. PCT/GB2020/051756, filed on Jul. 23, 2020, and titled "Aircraft Passenger Accommodation Unit With Moveable Ottoman," which application is related to and claims priority to United Kingdom Patent Application No. 1910807.5, filed on Jul. 29, 2019, and titled "Aircraft Passenger Accommodation Unit With Moveable Ottoman," both of which are hereby incorporated by reference in their entireties.

FIELD OF THE INVENTION

The present invention concerns aircraft passenger accommodation. More particularly, but not exclusively, this invention concerns an aircraft passenger accommodation unit with a moveable ottoman.

BACKGROUND OF THE INVENTION

First class seating generally aims to provide aircraft passengers with maximum comfort and privacy. However, the design of aircraft passenger accommodation units for first class seating is of course constrained by the limited availability of space within an aircraft cabin. The limited availability of space means that some aircraft passenger accommodation unit arrangements provide restricted access to the aircraft seats contained therein, which can pose a problem for persons with reduced mobility, especially wheelchair users.

Furthermore, United States Department of Transportation rules require that at least fifty percent of all aisle-seats within an aircraft cabin are able accommodate persons with reduced mobility. The cabin of an aircraft must satisfy this requirement if the aircraft is to operate from, or transit through the USA.

The present invention seeks to mitigate the above-mentioned problems. Alternatively or additionally, the present invention seeks to provide an improved aircraft passenger accommodation unit.

SUMMARY OF THE INVENTION

The present invention provides, according to a first aspect, an aircraft passenger accommodation unit comprising a seat, a wall, an ottoman, and a console. An access path comprising a width is defined between the wall and the ottoman, the access path providing passenger access to the seat. The ottoman is moveably mounted with respect to the console and moveable between an extended position and a retracted position to change the width of the access path. The ottoman is at least partially received within the console when the ottoman is in the retracted position.

A wall is provided to enclose the aircraft passenger accommodation unit and to provide a passenger of the aircraft passenger accommodation unit with privacy. To make the space within the aircraft passenger accommodation unit feel as private as possible, the length of the wall must be maximised to enclose the aircraft passenger accommodation unit as much as possible whilst leaving adequate space for an access path for passengers to gain access to the seat within the aircraft passenger accommodation unit. However, as mentioned above, it is desirable to provide passengers with reduced mobility, including wheelchair users, with access to the aircraft passenger accommodation unit. In an arrangement where the distance between the wall and an ottoman of the aircraft passenger accommodation unit defines the width of the passenger access path, the present invention provides a moveable ottoman to increase the width of the passenger access path and thereby provide access to the passenger accommodation unit for people with reduced mobility. Furthermore, the invention takes advantage of unused space within the console to partially store the ottoman when it is in the retracted position.

The console may comprise a table surface and/or may provide stowage for a meal table. When the accommodation unit is configured to be positioned adjacent another accommodation unit, for example in a central column between two aisles in an aircraft cabin, the console may comprise a privacy screen that serves as a dividing wall between the two accommodation units. The privacy screen may be retractable and the console may provide stowage for the retracted privacy screen.

With the ottoman in the extended position the width of the passenger access path may be a minimum. With the ottoman in the retracted position the width of the passenger access path may be a maximum. The ottoman may be slidably mounted in relation to the console and slidable between an extended position and a retracted position to change the width of the access path. In the extended position, the width of the passenger access path may be less than 408 millimetres, and more preferably less than 360 millimetres. In the retracted position, the width of the passenger access path may be greater than 408 millimetres. The aircraft passenger accommodation unit may be a business class aircraft passenger accommodation unit or a first class aircraft passenger accommodation unit.

In the extended position, substantially none of the ottoman may be received within the console. The console may have a main body. The main body of the console may have a width of at least 6 cm. Preferably the main body of the console has a width of at least 8 cm. The ottoman may be movable by at least 6 cm. Preferably the ottoman is moveable by at least 8 cm. The ottoman may be movable into the main body of the console by at least 6 cm. Preferably the ottoman is moveable into the main body of the console by at least 8 cm.

The wall may extend along an aisle-side of the seat. The wall may be an aisle-side privacy wall. The wall may be formed by a shell. The shell my comprise a rear privacy wall. The ottoman may be positioned in front of and spaced apart from the seat.

The console may define an aperture that is shaped to receive the ottoman. Preferably a main body of the console defines an aperture that is shaped to receive the ottoman.

Preferably the seat faces in a direction defining a longitudinal axis. The ottoman is preferably moveable between the extended position and the retracted position along an axis substantially perpendicular to the longitudinal axis. The ottoman may be restricted to movement along the axis substantially perpendicular to the longitudinal axis. The ottoman may be restricted to movement along the axis substantially perpendicular to the wall. The ottoman may be restricted to movement along the axis substantially perpendicular to the console. The aircraft passenger accommodation unit may comprise a transverse axis that is substantially perpendicular to the longitudinal axis. The ottoman and wall may be spaced apart along the transverse axis. When the ottoman is in the extended position, the ottoman and wall may be spaced apart along the transverse axis by 39 centimetres or less, preferably by 37 centimetres or less. When the ottoman is in the retracted position, the ottoman and wall may be spaced apart along the transverse axis by at least 40 centimetres, preferably by at least 42 centimetres.

The ottoman may be lockable in the extended and/or retracted position. Providing a locking function ensures that inertial loads do not move the ottoman between the extended and retracted positions during flight. The locking function may be an automatic locking function configured such that the ottoman is locked in either of the extended or retracted positions when moved into those respective positions. The lock may be releasable via a handle mounted upon a surface of the ottoman.

Preferably the ottoman is moveably mounted upon a base. The ottoman may comprise a track that runs along an underside of the ottoman, wherein the track slidingly engages with one or more projecting members that project from an upper surface of the base. Alternatively the base may comprise a track that runs along an upper surface of the base, wherein the track slidingly engages with one or more projecting members that project from an underside of the ottoman. The ottoman may thereby be configured to be slidable along the base between the extended position and the retracted position to change the width of the access path. The projecting members may be bosses that are spaced apart along an upper surface of the base. There may be a plurality of bosses. Preferably there are two bosses. Preferably the ottoman comprises a lock mechanism configured to engage with one or more of the bosses to lock the ottoman in the extended and/or retracted position. Preferably the lock mechanism is configured such that the ottoman becomes automatically locked in the extended position when the ottoman is moved into the extended position. Preferably the lock mechanism is configured such that the ottoman becomes automatically locked in the retracted position when the ottoman is moved into the retracted position. Preferably the ottoman comprises a release handle configured to operate the lock mechanism to release the ottoman from being locked in the extended position and/or retracted position.

Preferably the base forms part of the console. The base may also be referred to as a base plate. The base plate may define an angle of approximately 90 degrees with the console. The main body of the console may define an aperture that is shaped to receive the ottoman. The aperture may be located in the region where the base plate meets the main body of the console. The console may comprise a main body and a base. The base may project away from the main body, and the ottoman may be at least partially received in the main body when in the retracted position.

Preferably the wall is positioned on a first side of the aircraft seat and the console is positioned on a second, opposite side of the aircraft seat. The console may be positioned at the same end of the aircraft passenger accommodation unit as the ottoman. The ottoman may be positioned at a front end of the accommodation unit. The accommodation unit may comprise a rear end. The rear end may be behind the seat, at the opposite end of the accommodation unit to the ottoman. The main body of the console may be positioned on the second, opposite side of the aircraft seat. The main body of the console may be oriented substantially parallel to the wall. The aircraft passenger accommodation unit may have a width of 130 centimetres or less, preferably 120 centimetres or less, even more preferably 115 centimetres or less. The width of the aircraft passenger accommodation unit may be defined by the distance between an outer surface of the main body of the console and an outer surface of the wall.

The ottoman may be oriented at substantially 90 degrees to the wall. The ottoman may be oriented at substantially 90 degrees to the console. The ottoman may be oriented at substantially 90 degrees to the main body of the console. The ottoman may have a width of at least 60 centimetres, preferably at least 65 centimetres.

According to a second aspect, the present invention provides an ottoman and base, wherein the ottoman comprises a track that runs along an underside of the ottoman and wherein the track slidingly engages with one or more projecting members that project from an upper surface of the base, or wherein the base comprises a track that runs along an upper surface of the base and wherein the track slidingly engages with one or more projecting members that project from an underside of the ottoman, the ottoman thereby being configured to be slidably moveable with respect to the base. Preferably the ottoman comprises a lock mechanism configured to engage with one or more of the bosses to lock the ottoman in the extended and/or retracted position. Preferably the lock mechanism is configured such that the ottoman becomes automatically locked in the extended position when the ottoman is moved into the extended position. Preferably the lock mechanism is configured such that the ottoman becomes automatically locked in the retracted position when the ottoman is moved into the retracted position.

According to a third aspect, the present invention provides a kit of parts configured such that when assembled, the kit of parts forms the aircraft passenger accommodation unit of the first aspect of the invention.

It will of course be appreciated that features described in relation to one aspect of the present invention may be incorporated into other aspects of the present invention. For example, the base and/or ottoman of the second aspect of the invention may incorporate any of the features described with reference to the base and/or ottoman of aircraft passenger accommodation unit according to the first aspect of the invention of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
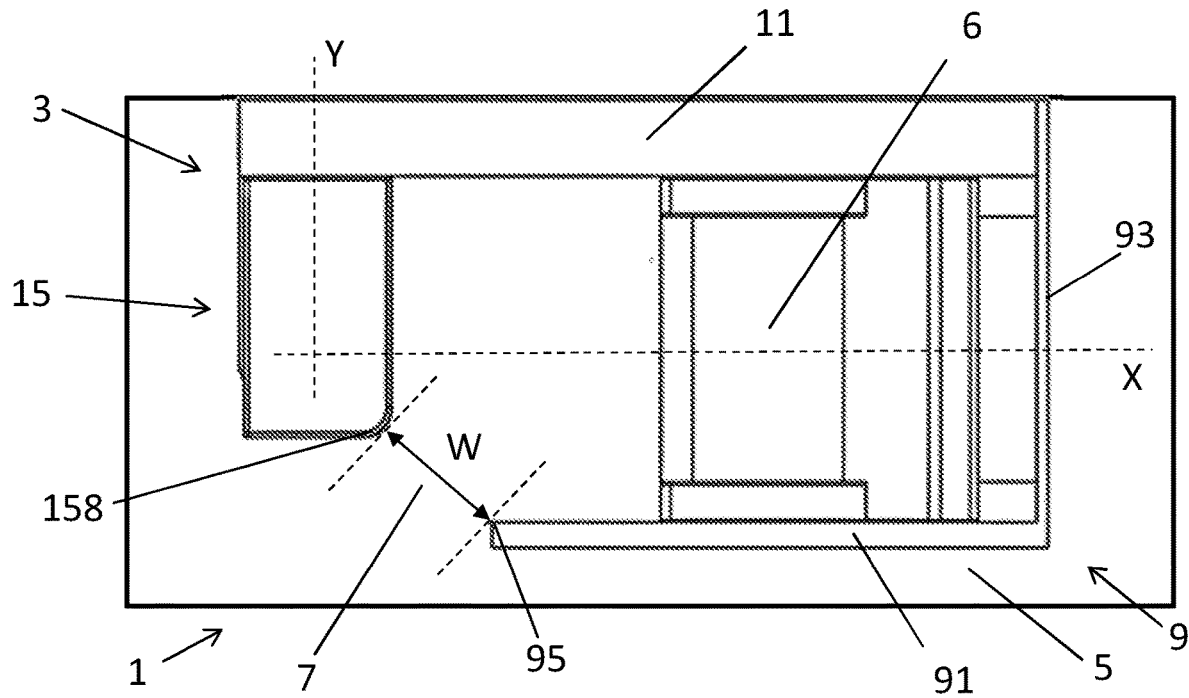
FIG. 1 is a plan view of an aircraft passenger accommodation unit according to a first embodiment of the invention positioned within an aircraft cabin.

An aircraft cabin 1 comprising an aircraft passenger accommodation unit 3 according to a first embodiment of the invention is shown in FIG. 1. The aircraft passenger accommodation unit 3 is positioned adjacent to an aisle 5 of the aircraft cabin 1 and comprises an access path 7 that provides passenger access from the aisle 5 into the aircraft passenger accommodation unit 3, as will be discussed in more detail below.

Figure 2:
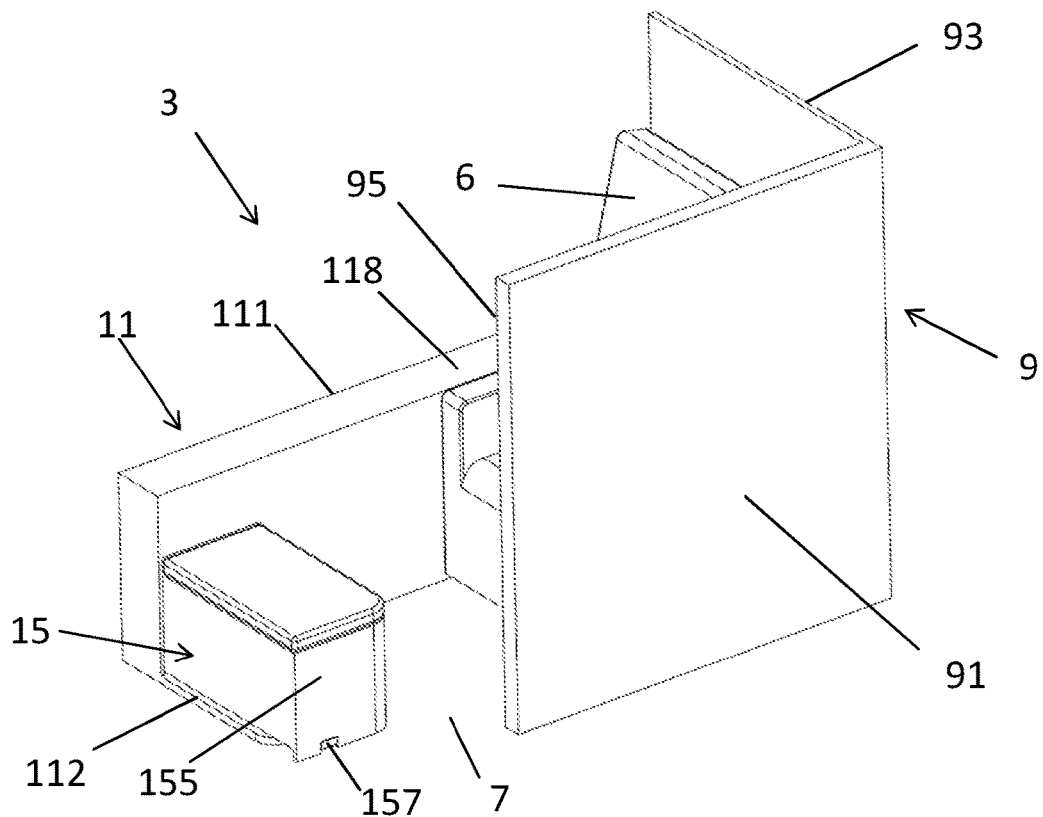
FIG. 2 is a perspective view of the aircraft passenger accommodation unit shown in FIG. 1.

The aircraft passenger accommodation unit 3, which is shown in more detail in FIG. 2, comprises a seat 6 facing in a direction defining a longitudinal axis X. The seat 6 is partially surrounded by a shell 9, the shell 9 comprises a aisle-side privacy wall 91 which extends along the aisle-side of the seat 6 and a rear privacy wall 93 that encloses the aircraft passenger accommodation unit 3 to the rear of the seat 6. A console 11 comprising a main body 111 is positioned parallel to the privacy wall 91 on the opposite, non-aisle side of the seat 6. The main body 111 provides a table surface 118 for a passenger of the accommodation unit 3, and stows a meal table. The distance between the outside surface of the main body 111 and the outside surface of the privacy wall 91 defines an aircraft passenger accommodation unit width of 115 centimetres. An ottoman 15 having a width of 65 centimetres in a direction along a transverse axis Y, which is substantially perpendicular to the longitudinal axis X, is positioned in front of and spaced apart from the seat 6. The seat 6 is configurable between an upright seating configuration, as shown in FIGS. 1, 2, 6, and 7 and a lie-flat bed-mode configuration (not shown) in which the seat 6 forms a contiguous flat surface with the ottoman 15.

Figure 3:
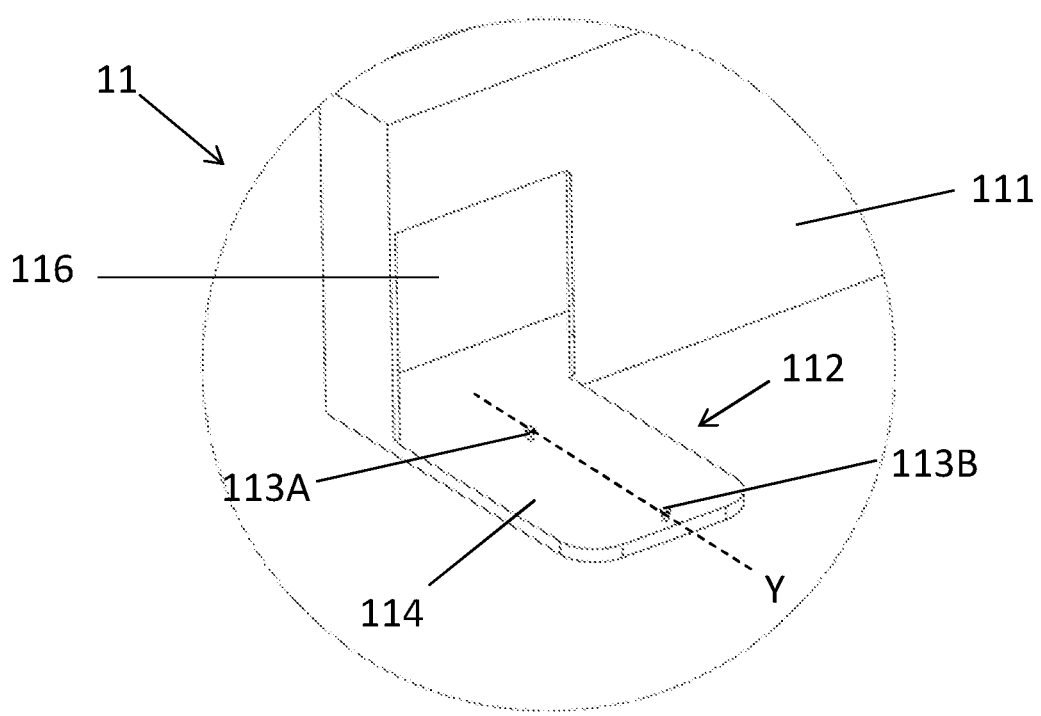
FIG. 3 is a detailed view of the base plate of the console of the aircraft passenger accommodation unit.
Figure 4:
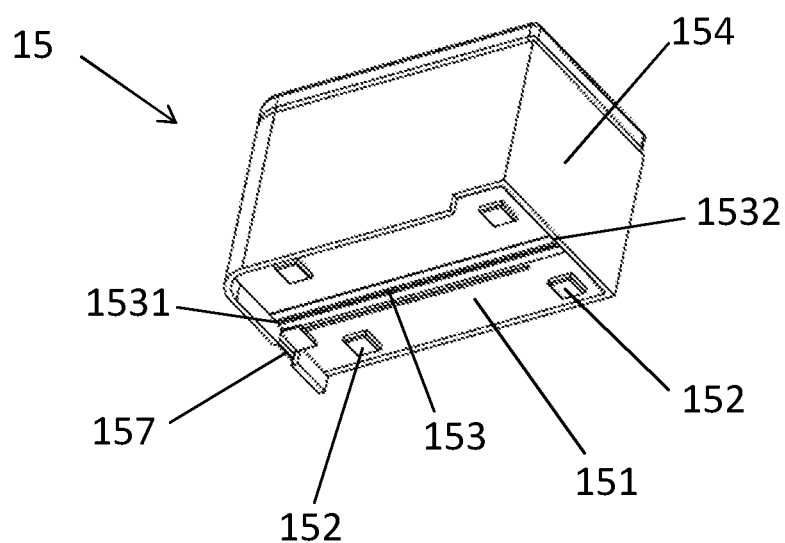
FIG. 4 is a perspective view of the underside of the ottoman of the aircraft passenger accommodation unit.

The console 11 comprises a base plate 112, which is shown in more detail in FIG. 3, that is secured to the floor of the aircraft cabin 1 and upon which the ottoman 15 is mounted. The base plate 112 projects at substantially 90 degrees away the main body 111 of the console 11 towards the aisle 5. Two guide bosses 113A, 113B project upwardly from the upper surface 114 of the base plate 112 and are spaced apart along the transverse axis Y. As can be seen in FIG. 4, a track 153 configured to receive the bosses 113A, 113B runs along the length of ottoman 15 on the underside 151 of the ottoman 15 and a plurality of high friction pads 152 are positioned either side of the track 153. The track 153 has an aisle-side end 1531 at the aisle-side end 155 of the ottoman 15, the aisle-side end 155 of the ottoman being the end situated closest to the aisle 5 and furthest away from the main body 111 of the console 11. The track 153 has a non-aisle-side end 1532 at the non-aisle-side end 154 of the ottoman 15, the non-aisle-side end 154 of the ottoman 15 being the end situated furthest away from the aisle 5, at the opposite end of the ottoman 15 to the aisle-side end 155 of the ottoman 15. In use, the bosses 113A, 113B of the base plate 112 are contained within the track 153 of the ottoman 15 and the high friction pads 152 rest against the upper surface 114 of the base plate 112. The ottoman 15 is therefore slidable along the transverse axis Y, allowing the ottoman 15 to be moved towards or away from the aisle 5.

The high friction pads 152 engage with the upper surface 114 of the base plate 112 to prevent the ottoman 15 sliding freely when unlocked and subjected to inertial loads. An aperture 116 is defined in the main body 111 of the console, above the base plate 114 where the base plate 114 meets the main body 111. The aperture 116 being shaped to receive the ottoman 15 such that when the ottoman 15 is moved in the direction away from the aisle 5, the non-aisle end 154 of the ottoman 15 moves into the aperture 116.

The main body 111 of the console 11 has a width of approximately 8 centimetres. The ottoman 15 is thereby moveable between an extended position in which the ottoman 15 is located fully outside the main body 111 and a retracted position in which approximately 8 centimetres of the length of the ottoman 15 is received within the main body 111. When the ottoman 15 is in the extended position the aisle-end 155 of the ottoman 15 and the aisle-side privacy wall 91 are spaced apart along the transverse Y axis by approximately 37 centimetres. When the ottoman 15 is in the retracted position the aisle-end 155 of the ottoman 15 and the aisle-side privacy wall 91 are spaced apart along the transverse Y axis by approximately 45 centimetres.

The ottoman 15 comprises a locking mechanism 40 that is configured to engage with the guide bosses and automatically lock the ottoman 15 in either the extended position or the retracted position when the ottoman 15 is moved into either of those respective positions, as will now be described with reference to FIGS. 5a to 5c. The lock mechanism 40, comprises an aisle-side latch 41A that is spaced apart along the track 153 of the ottoman from a non-aisle-side latch 41B. The aisle-side latch 41A is spaced-apart from the aisle-side end 1531 of the track 153 by a distance approximately equal to the diameter of the aisle-side guide boss 113A, and the non-aisle-side latch 41B is spaced-apart from the non-aisle-side end 1532 of the track 153 by a distance approximately equal to the diameter of the non-aisle-side guide boss 113B (in the presently described embodiment the diameters of the guide bosses 113A, 133B are equal). The latches 41A, 41B are biased by a spring into the position as shown in FIG. 5a in which they span the width of the track 153, so that when the guide bosses 113A, 113B are moved along the track 153 the guide bosses 113A, 113B come into contact with and abut the latches 41A, 41B.

Figure 5A:
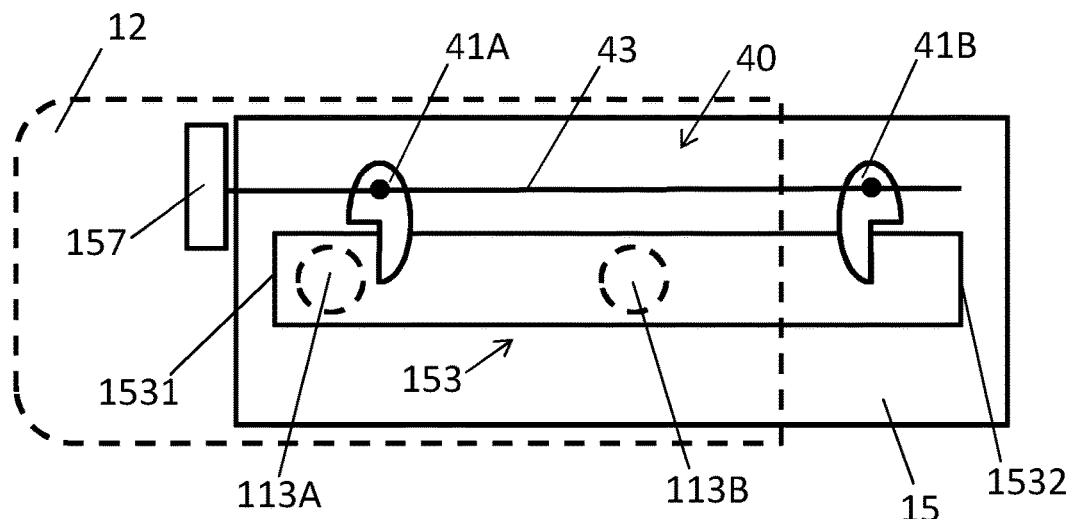
FIG. 5a is a schematic plan view illustrating the locking mechanism within the ottoman, with the features of a base plate shown in broken lines and the features of the ottoman shown in unbroken lines, in the figure the ottoman is shown as being locked in a retracted position.
Figure 5B:
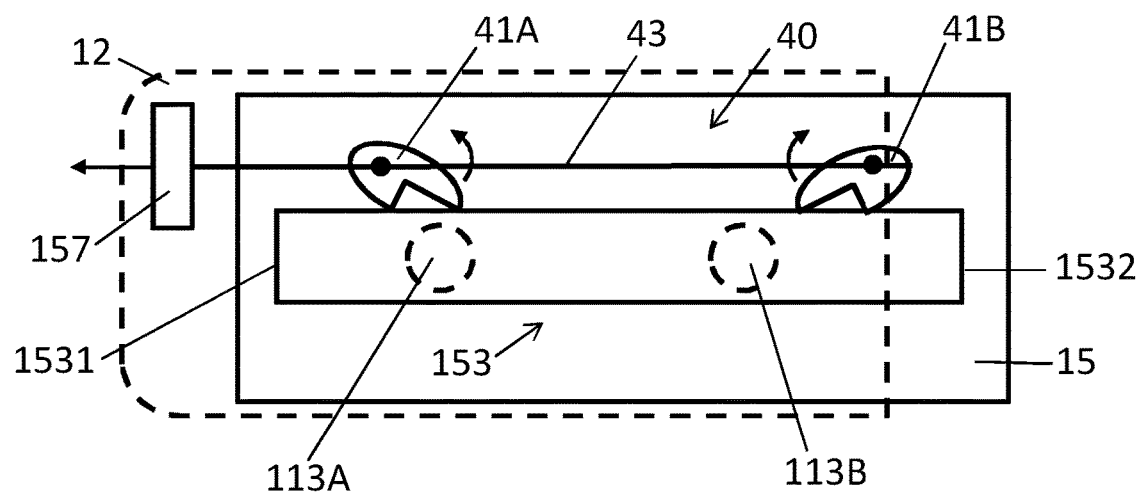
FIG. 5b corresponds to FIG. 5a but wherein a release handle of the ottoman has been actuated and the ottoman is being moved from the retracted position to an extended position.
Figure 5C:
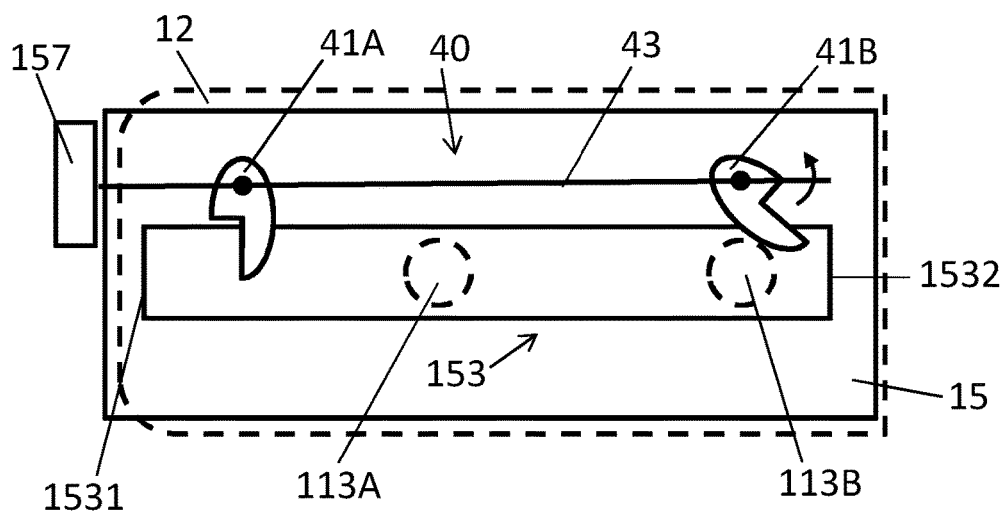
FIG. 5c corresponds to FIG. 5b but wherein the ottoman is being moved into the extended position.

In FIG. 5a the ottoman 15 is shown as locked in the retracted position. As can be seen, the aisle-side guide boss 113A is positioned between the aisle-side latch 41A and the aisle-side end 1531 of the track 153. If the ottoman 15 is moved in a direction that would move the ottoman 15 further into the console 11 (from left to right in FIG. 5a) then the aisle-side guide boss 113A would abut the aisle-side end 1531 of the track 153. If the ottoman 15 is moved in the opposite direction, towards the extended position (from right to left in FIG. 5a), then the aisle-side guide boss 113A would abut the aisle-side latch 41A. The lock system 40 is configured such that the aisle-side latch 41A is not movable by the aisle-side guide boss 113A from the position in which the aisle-side latch 41A spans the track 153 when the aisle-side guide boss 113A abuts the aisle-side latch 41A as the ottoman 15 is moved from the retracted position towards the extended position. The aisle-side latch 41A therefore prevents the aisle-side guide boss 113A from moving along the track 153, out of the retracted position. Because the aisle-side latch 41A is spaced apart from the aisle-side end 1531 of the track 153 by a distance approximately equal to the diameter of the aisle-side guide boss 113A, the ottoman 15 is effectively locked in the retracted position when the aisle-side guide boss 113A is positioned between the aisle-side latch 41A and aisle-side end 1531 of the track 153.

Similarly, the ottoman 15 becomes locked in the extended position when the non-aisle-side guide boss 113B is positioned between the non-aisle-side latch 41B and the non-aisle-side end of the track 1532. The non-aisle-side latch 41B is not movable by the non-aisle-side guide boss 113B from the position in which the non-aisle-side latch 41B spans the track 153 when the non-aisle-side guide boss 113B abuts the non-aisle-side latch 41B as the ottoman 15 is moved from extended position towards the retracted position. Because the non-aisle-side latch 41B is spaced apart from the non-aisle-side end 1532 of the track 153 by a distance approximately equal to the diameter of the non-aisle-side guide boss 113B, the ottoman 15 is effectively locked in the extended position when the non-aisle-side guide boss 113B is positioned between the non-aisle-side latch 41B and non-aisle-side end 1532 of the track 153.

To release the ottoman 15 from the retracted position, the release handle 157 must be pulled. The release handle operates a linkage 43 that is connected to both the aisle-side latch 41A and the non-aisle-side latch 41B. When the release handle 157 is pulled, the linkage 43 rotates both the aisle-side latch 41A and the non-aisle-side latch 41B simultaneously. The aisle-side latch 41A is rotated in a direction away from the aisle-side end 1531 of the track 153 (anti-clockwise as shown in FIGS. 5a to 5c) and the non-aisle-side latch 41B is rotated in a direction away from the non-aisle-side end 1532 of the track 153 (clockwise as shown in FIGS. 5a to 5c). When the release handle 157 is pulled, the latches 41A, 41B are rotated to a position in which they are no longer positioned across the track 153. Therefore with the release handle 157 pulled, the latches 41A, 41B can no longer prevent movement of the guide bosses 113A, 113B along the track 153, as can be seen in FIG. 5b. As such, to move the ottoman 15 from the retracted position, as shown in FIG. 5a, to the extended position, the release handle 157 must be pulled to rotate the aisle-side latch 41A to the position as shown in FIG. 5b in which it no longer prevents the aisle-side guide boss 113A from moving along the track 153. Similarly, to move the ottoman 15 from the extended position in which the non-aisle-side guide boss 113B is positioned between the non-aisle-side end 1532 of the track 153 and the non-aisle-side latch 41B, to the retracted position, the release handle must be pulled to move the non-aisle-side latch 41B to a position in which it no longer prevents the non-aisle-side guide boss 113B from moving along the track 153.

Once the ottoman 15 is no longer locked in position, the release handle 157 can be released and the guide bosses 113A, 113B are free to slide along the track 153 as the ottoman 15 is moved. The ottoman 15 becomes automatically locked in position only when moved into the extended or retracted positions. Automatic locking is achieved by the latches 41A, 41B being configured to be rotatable out of the track 153 by the bosses 113A, 113B when the bosses 113A, 113B abut the respective latches 41A, 41B upon being moved into the respective extended or retracted positions. FIG. 5c shows the ottoman 15 being moved into the extended position. As can be seen, the non-aisle-side guide boss 113B has come into contact with the non-aisle latch 41B and has pushed the non-aisle latch 41B away from the position in which it blocks the track 153 (anti-clockwise as shown in FIG. 5c). The latches 41A, 41B are resiliently biased by a spring towards the position shown in FIG. 5a in which they block the track 153 so that when the non-aisle guide boss 113B moves from the position in which it is shown in FIG. 5c further towards the non-aisle-side end 1532 of the track 153, the non-aisle-side guide boss 113B eventually moves past the non-aisle-side latch 41B whereupon the non-aisle-side latch 41B returns to the position in which it blocks the track 153. The non-aisle-side guide boss 113B is then positioned between the non-aisle-side latch 41B and the non-aisle-end 1532 of the track 153, and the ottoman 15 is thereby locked in the extended position.

Figure 6:
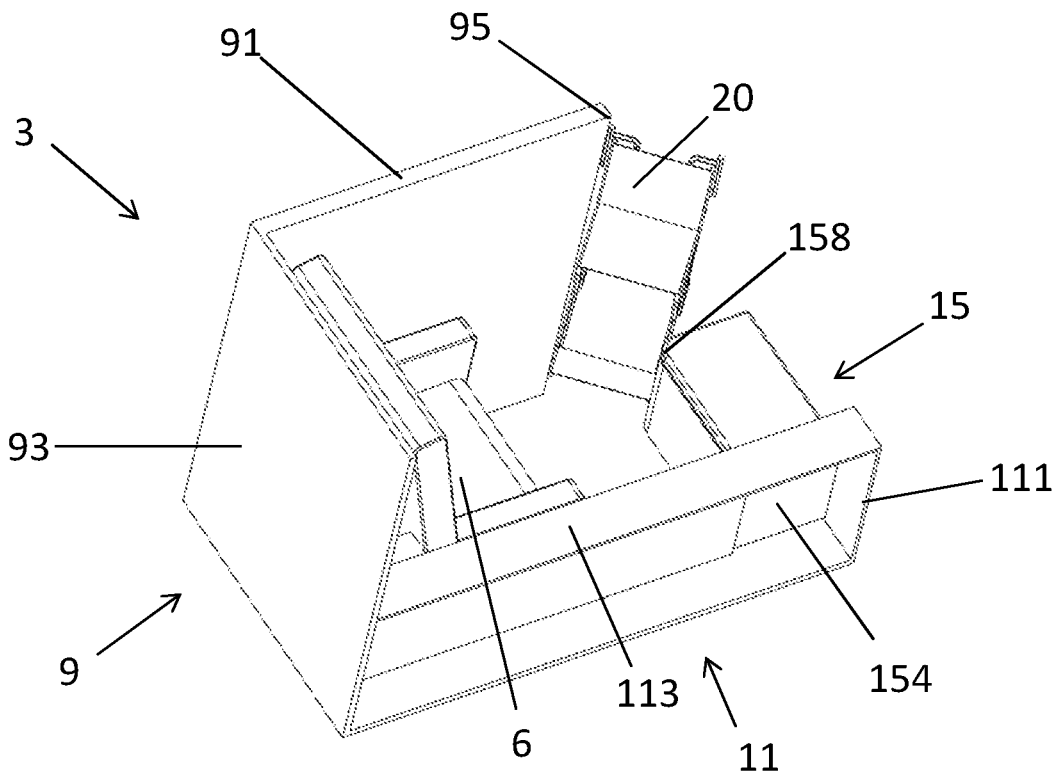
FIG. 6 is a perspective view of the aircraft passenger accommodation unit with the ottoman in an extended position in which the passenger access path of the aircraft passenger accommodation unit is too narrow to allow wheelchair access into the aircraft passenger accommodation unit.
Figure 7:
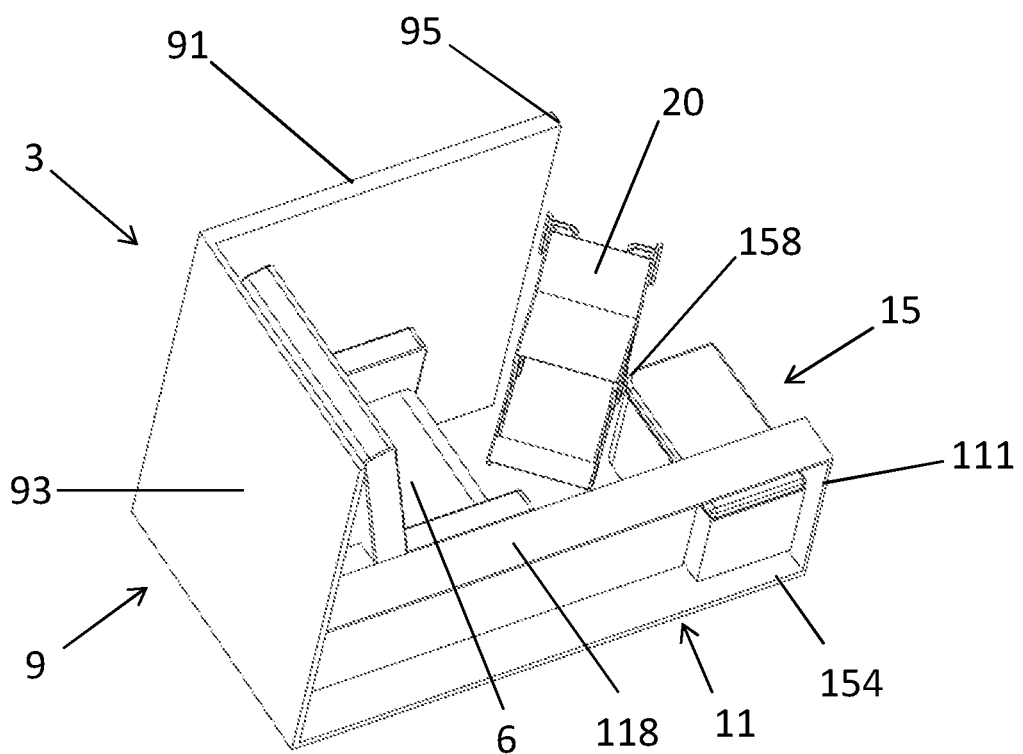
FIG. 7 corresponds to the view of FIG. 6 but with the ottoman moved to a retracted position to increase the width of the passenger access path to allow wheelchair access to the aircraft passenger accommodation unit.

As can be seen in FIG. 1, the width of the passenger access path 7 is at its narrowest between the aisle-side corner 158 of the ottoman 15 that is closest to the seat 6 and the non-aisle side corner 95 of the privacy wall 91. The distance between the ottoman corner 158 and the privacy wall corner 95 defines a passenger access path 7 width W. With the ottoman 15 in the extended position, the width W of the access path 7 of the presently described embodiment of the invention is approximately 36 centimetres which, as can be seen from FIG. 6, is too narrow to allow a wheelchair 20 which has a width of approximately 41 centimetres into the aircraft passenger accommodation unit 3. However, when the ottoman 15 is moved to its retracted position, where the ottoman 15 is partially received within the console 11, the corner 158 of the ottoman 15 closest to the wall 91 is moved away from the wall 91, thereby increasing the width W of the passenger access path 7 to a size of approximately 45 centimetres. With the ottoman 15 in the retracted position, therefore, the wheelchair 20 can be moved into the aircraft passenger accommodation unit 3, as shown in FIG. 7, to allow a passenger with reduced mobility access to the aircraft seat.

Whilst the present invention has been described and illustrated with reference to particular embodiments, it will be appreciated by those of ordinary skill in the art that the invention lends itself to many different variations not specifically illustrated herein. For example, in a further, different, embodiment of the invention, the ottoman is moveable along an axis that is substantially parallel with the axis defined by the passenger seat such that the ottoman is moveable towards and away from the passenger seat to change the width of the passenger access path. In this embodiment of the invention the ottoman is moveable away from the seat to a retracted position in which the ottoman is partially received within a console positioned in front of the seat.

In another embodiment of the invention, the ottoman and base plate are arranged in substantially the same way as the ottoman and base plate of the first embodiment of the invention. However, the base plate is independent of a console.

In a further, different embodiment of the invention, the aircraft accommodation unit is substantially identical to the accommodation unit of the first embodiment of the invention. However, the two guide bosses project downwardly from underside of the ottoman and a track configured to receive the bosses runs along the upper surface of the base plate, with the high friction pads being fixed either side of the track. Similarly to the first embodiment of the invention, the bosses are contained within the track such that the ottoman is slidable towards or away from the aisle.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft passenger accommodation unit comprising a seat facing in a direction defining a longitudinal axis, a wall, an ottoman, and a console, wherein an access path comprising a width is defined between the wall and the ottoman, the access path providing passenger access to the seat, wherein the ottoman is moveably mounted with respect to the console and is moveable along an axis oriented substantially perpendicular to the longitudinal axis between an extended position and a retracted position to change the width of the access path, and wherein the ottoman is at least partially received within the console when the ottoman is in the retracted position.

2. An aircraft passenger accommodation unit according to claim 1, wherein the console defines an aperture that is shaped to receive the ottoman.

3. An aircraft passenger accommodation unit according to claim 1, wherein the wall is positioned on a first side of the seat and wherein the console is positioned on a second, opposite side of the seat.

4. An aircraft passenger accommodation unit according to claim 1, wherein the ottoman is lockable in the extended and/or retracted position.

5. An aircraft passenger accommodation unit according to claim 1, wherein the ottoman is moveably mounted upon a base.

6. An aircraft passenger accommodation unit according to claim 5, wherein the base forms part of the console.

7. An aircraft passenger accommodation unit according to claim 6, wherein the console comprises a main body and the base, wherein the base projects away from the main body, and wherein the ottoman is at least partially received in the main body when in the retracted position.

8. An aircraft passenger accommodation unit according to claim 5,
wherein the ottoman comprises a track that runs along an underside of the ottoman and wherein the track slidingly engages with one or more projecting members that project from an upper surface of the base, or
wherein the base comprises a track that runs along an upper surface of the base and wherein the track slidingly engages with one or more projecting members that project from an underside of the ottoman,
the ottoman thereby being configured to be slidable along the base between the extended position and the retracted position to change the width of the access path.

9. An aircraft passenger accommodation unit according to claim 8, wherein the ottoman comprises a track that runs along an underside of the ottoman and wherein the track slidingly engages with one or more projecting members that project from an upper surface of the base.

10. An aircraft passenger accommodation unit according to claim 9, wherein the projecting members are bosses that are spaced apart along an upper surface of the base.

11. An aircraft passenger accommodation unit according to claim 10, wherein the ottoman comprises a lock mechanism configured to engage with one or more of the bosses to lock the ottoman in the extended and/or retracted position.

12. An aircraft passenger accommodation unit according to claim 11, wherein the lock mechanism is configured such that the ottoman becomes automatically locked in the retracted position when the ottoman is moved into the retracted position.

13. An aircraft passenger accommodation unit according to claim 11, wherein the lock mechanism is configured such that the ottoman becomes automatically locked in the extended position when the ottoman is moved into the extended position.

14. An aircraft passenger accommodation unit according to claim 13, wherein the ottoman comprises a release handle configured to operate the lock mechanism to release the ottoman from being locked in the extended position and/or retracted position.

15. A kit of parts configured such that when assembled, the kit of parts forms an aircraft passenger accommodation unit as defined in claim 1.

16. An aircraft passenger accommodation unit comprising a seat, a wall, an ottoman, a base, and a console, wherein an access path comprising a width is defined between the wall and the ottoman, the access path providing passenger access to the seat; the ottoman is moveably mounted upon the base and is moveable with respect to the console between an extended position and a retracted position to change the width of the access path; the ottoman is at least partially received within the console when the ottoman is in the retracted position; and:
the ottoman comprises a track that runs along an underside of the ottoman and the track slidingly engages with one or more projecting members that project from an upper surface of the base, or
the base comprises a track that runs along an upper surface of the base and the track slidingly engages with one or more projecting members that project from an underside of the ottoman,
the ottoman thereby being configured to be slidable along the base between the extended position and the retracted position to change the width of the access path.

17. An aircraft passenger accommodation unit according to claim 16, wherein the ottoman comprises the track that runs along the underside of the ottoman and slidingly engages with the one or more projecting members that project from the upper surface of the base and the one or more projecting members are two or more bosses that are spaced apart along an upper surface of the base; and the ottoman comprises a lock mechanism configured to engage with at least one of the two or more bosses to lock the ottoman in the extended and/or retracted position.

18. An aircraft passenger accommodation unit according to claim 17, wherein the ottoman comprises a release handle configured to operate the lock mechanism to release the ottoman from being locked in the extended position and/or retracted position.

19. An aircraft passenger accommodation unit according to claim 17, wherein the lock mechanism is configured such that the ottoman becomes automatically locked in the extended position when the ottoman is moved into the extended position.

20. An aircraft passenger accommodation unit according to claim 17, wherein the lock mechanism is configured such that the ottoman becomes automatically locked in the retracted position when the ottoman is moved into the retracted position.

* * * * *